US009210344B2

(12) United States Patent
Shiohara

(10) Patent No.: US 9,210,344 B2
(45) Date of Patent: Dec. 8, 2015

(54) DISPLAY CONTROL DEVICE

(71) Applicant: SEIKO EPSON CORPORATION, Tokyo (JP)

(72) Inventor: Ryuichi Shiohara, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/445,809

(22) Filed: Jul. 29, 2014

(65) Prior Publication Data

US 2014/0333804 A1 Nov. 13, 2014

Related U.S. Application Data

(63) Continuation of application No. 14/022,572, filed on Sep. 10, 2013, now Pat. No. 8,804,002, which is a continuation of application No. 13/118,863, filed on May 31, 2011, now Pat. No. 8,558,911.

(30) Foreign Application Priority Data

Jun. 1, 2010 (JP) ................................. 2010-125568

(51) Int. Cl.
*H04N 5/357* (2011.01)
*H04N 5/232* (2006.01)
*G09G 3/36* (2006.01)
*G06T 1/00* (2006.01)

(52) U.S. Cl.
CPC ................ *H04N 5/3572* (2013.01); *G06T 1/00* (2013.01); *G09G 3/36* (2013.01); *G09G 3/3611* (2013.01); *H04N 5/23209* (2013.01); *H04N 5/23232* (2013.01); *H04N 5/23293* (2013.01); *H04N 5/357* (2013.01)

(58) Field of Classification Search
CPC .......... H04N 5/23203; H04N 5/23209; H04N 5/23232; H04N 5/23293; H04N 5/3572; G09G 3/3611
See application file for complete search history.

(56) References Cited

U.S. PATENT DOCUMENTS

| | | | |
|---|---|---|---|
| 5,905,530 A | 5/1999 | Yokota et al. |
| 6,801,246 B2 | 10/2004 | Horlander |
| 7,710,468 B2 | 5/2010 | Uchida et al. |
| 8,341,689 B2 | 12/2012 | Craddock et al. |
| 8,558,911 B2 | 10/2013 | Shiohara |

(Continued)

FOREIGN PATENT DOCUMENTS

| | | |
|---|---|---|
| JP | 06-0165024 A | 6/1994 |
| JP | 2002-366127 A | 12/2002 |

(Continued)

*Primary Examiner* — Daniel M Pasiewicz
(74) *Attorney, Agent, or Firm* — Global IP Counselors, LLP

(57) ABSTRACT

An imaging device includes a lens unit, an image sensor, a processing unit, and a display unit. The image sensor is configured to output a first data based on a subject image through the lens unit. The processing unit is configured to correct a distortion of the first data caused by an optical property of the lens unit and to output a second data. The display unit is configured to display based on the second data for each of predetermined lines in a display area. The first predetermined line is a line displayed at a first or last horizontal synchronization time. The second predetermined line is a line displayed at horizontal synchronization time other than the first or last horizontal synchronization time. The first or last horizontal synchronization time is longer than the horizontal synchronization time other than the first or last horizontal synchronization time.

8 Claims, 8 Drawing Sheets

(56) References Cited

U.S. PATENT DOCUMENTS

| | | | |
|---|---|---|---|
| 8,804,002 B2 * | 8/2014 | Shiohara | 348/222.1 |
| 2004/0196380 A1 | 10/2004 | Shimazu et al. | |
| 2006/0284986 A1 | 12/2006 | Ahn et al. | |

FOREIGN PATENT DOCUMENTS

| | | |
|---|---|---|
| JP | 2003-333377 A | 11/2003 |
| JP | 2007-243615 A | 9/2007 |

* cited by examiner

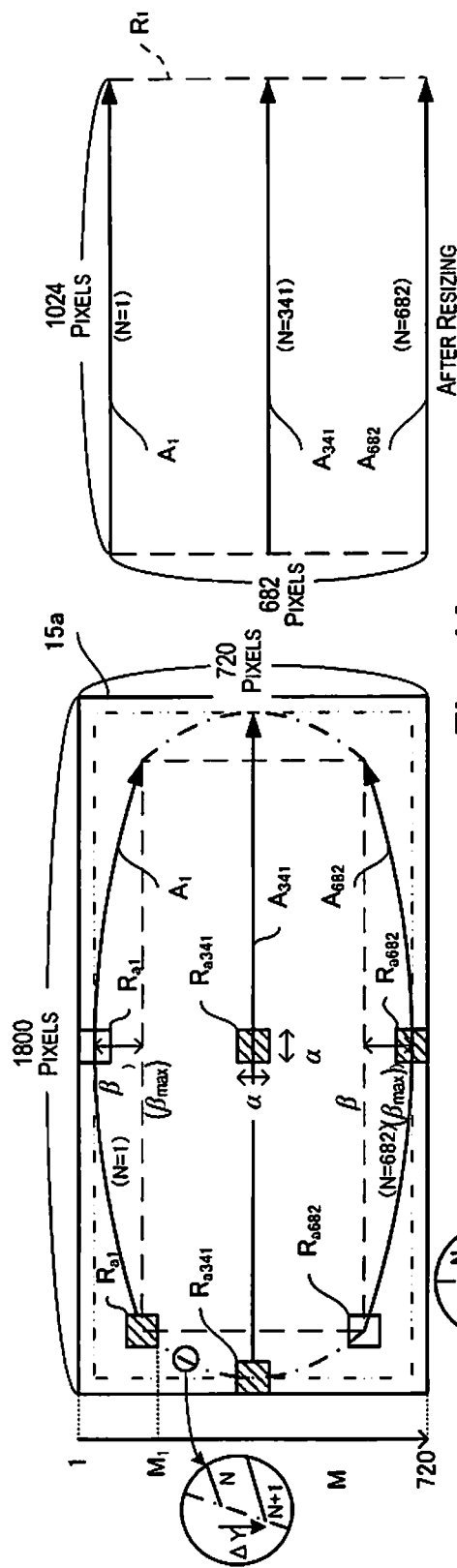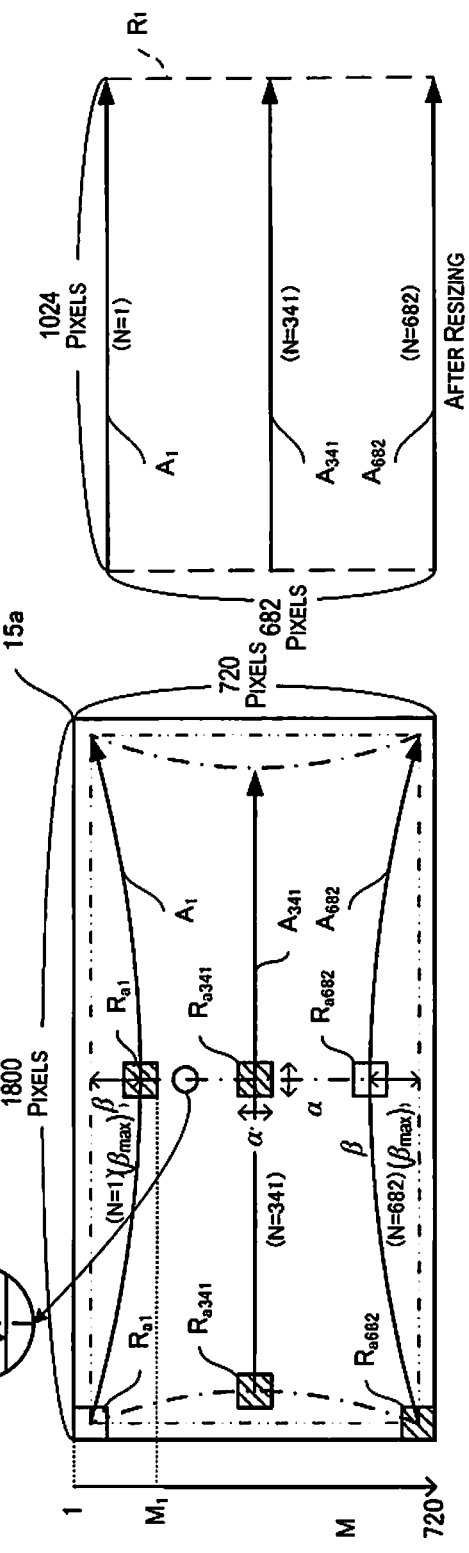
Fig. 4A
Fig. 4B

DISPLAY CONTROL DEVICE

CROSS-REFERENCE TO RELATED APPLICATIONS

This is a continuation application of U.S. patent application Ser. No. 14/022,572, which is a continuation application of U.S. patent application Ser. No. 13/118,863. This application claims priority to Japanese Patent Application No. 2010-125568 filed on Jun. 1, 2010. The entire disclosures of U.S. patent application Ser. Nos. 14/022,572 and 13/118,863 and Japanese Patent Application No. 2010-125568 are hereby incorporated herein by reference.

BACKGROUND

1. Technical Field

The present invention relates to a display control device for displaying by predetermined data units.

2. Related Art

Pickup devices for displaying an image picked up by an image sensor on a liquid crystal display have been known in the art, and techniques have been developed to prevent delaying an image to be displayed on a liquid crystal display relative to the actual subject. For example, Japanese Laid-Open Patent Application Publication No. 2007-243615 has disclosed a technique for reading and displaying an image signal on a liquid crystal display before writing the image signal of one frame on a VRAM has ended in an image-capturing device having a VRAM for recording an image signal for one frame. Specifically, a configuration is described in which the imaging cycle required for an image sensor to record one frame of an image signal is the same as the reproduction cycle for displaying one frame of an image on a liquid crystal display, and the reproduction cycle is started at a timing that is delayed from the start of the imaging cycle for each frame by a factor of a phase difference $\Delta T$.

SUMMARY

In the technique of Japanese Laid-Open Patent Application Publication No. 2007-243615, a predetermined phase difference $\Delta T$ is defined for each frame. Specifically, this publication describes defining a phase difference $\Delta T$ for each mode (Japanese Laid-Open Patent Application Publication No. 2007-243615, paragraph [0057]), and determining the phase difference $\Delta T$ so as not to read image data before the data have been written in the VRAM (Japanese Laid-Open Patent Application Publication No. 2007-243615, paragraphs [0055] and [0056]). Therefore, although changing for each mode, the phase difference $\Delta T$ is shared by all frames in the same mode, and the shared phase difference $\Delta T$ is applied to all lines of the image to be displayed.

In a configuration in which image processing is applied to a subject image based on output data of an image sensor, however, the time required for various types of image processing may differ for each line. Therefore, to provide a shared phase difference $\Delta T$ so as not to read image data before all lines of an image to be displayed have been written, the phase difference $\Delta T$ must be defined to allow a margin so that image data are not read first. For example, means must be considered such as defining the phase difference $\Delta T$ by taking into account the maximum time required to prepare image data for all lines. Specifically, the phase difference $\Delta T$ must be defined to be sufficiently long that image data are not read before writing in any of the lines, taking into account the maximum time required to prepare image data for all lines.

Therefore, configurations in which the time required to prepare image data may vary by line have had the problem that the delay from ending preparation of image data to displaying the image data on a liquid crystal display is unnecessarily long for lines that require a short time to prepare image data. The process unit in these configurations has not been limited to one line.

With the foregoing aspects of the prior art in view, it is an object of the present invention to shorten the display delay when the time required to prepare image data varies by predetermined data units.

According to a first aspect of the present invention, an imaging device includes a lens unit, an image sensor, a processing unit, a display unit. The image sensor is configured to output a first data based on a subject image through the lens unit. The processing unit is configured to correct a distortion of the first data caused by an optical property of the lens unit and to output a second data obtained by correcting the first data. The display unit is configured to display based on the second data for each of predetermined lines in a display area. The predetermined lines include a first predetermined line and a second predetermined line. The first predetermined line is a line displayed in the display area at a first or last horizontal synchronization time. The second predetermined line is a line displayed in the display area at horizontal synchronization time other than the first or last horizontal synchronization time. The first or last horizontal synchronization time is longer than the horizontal synchronization time other than the first or last horizontal synchronization time.

BRIEF DESCRIPTION OF THE DRAWINGS

Referring now to the attached drawings which form a part of this original disclosure:

FIG. 4A is a schematic view illustrating resizing in the case of barrel aberration, and FIG. 4B is a schematic view illustrating resizing in the case of pincushion aberration.

DETAILED DESCRIPTION OF EXEMPLARY EMBODIMENTS

Preferred embodiments of the present invention will be described hereinafter in the following order: (1) Configuration of Image-capturing device; (2) Control of Horizontal Synchronization Signal; and (3) Other Embodiments.

(1) Configuration of Image-Capturing Device

Figure 1:
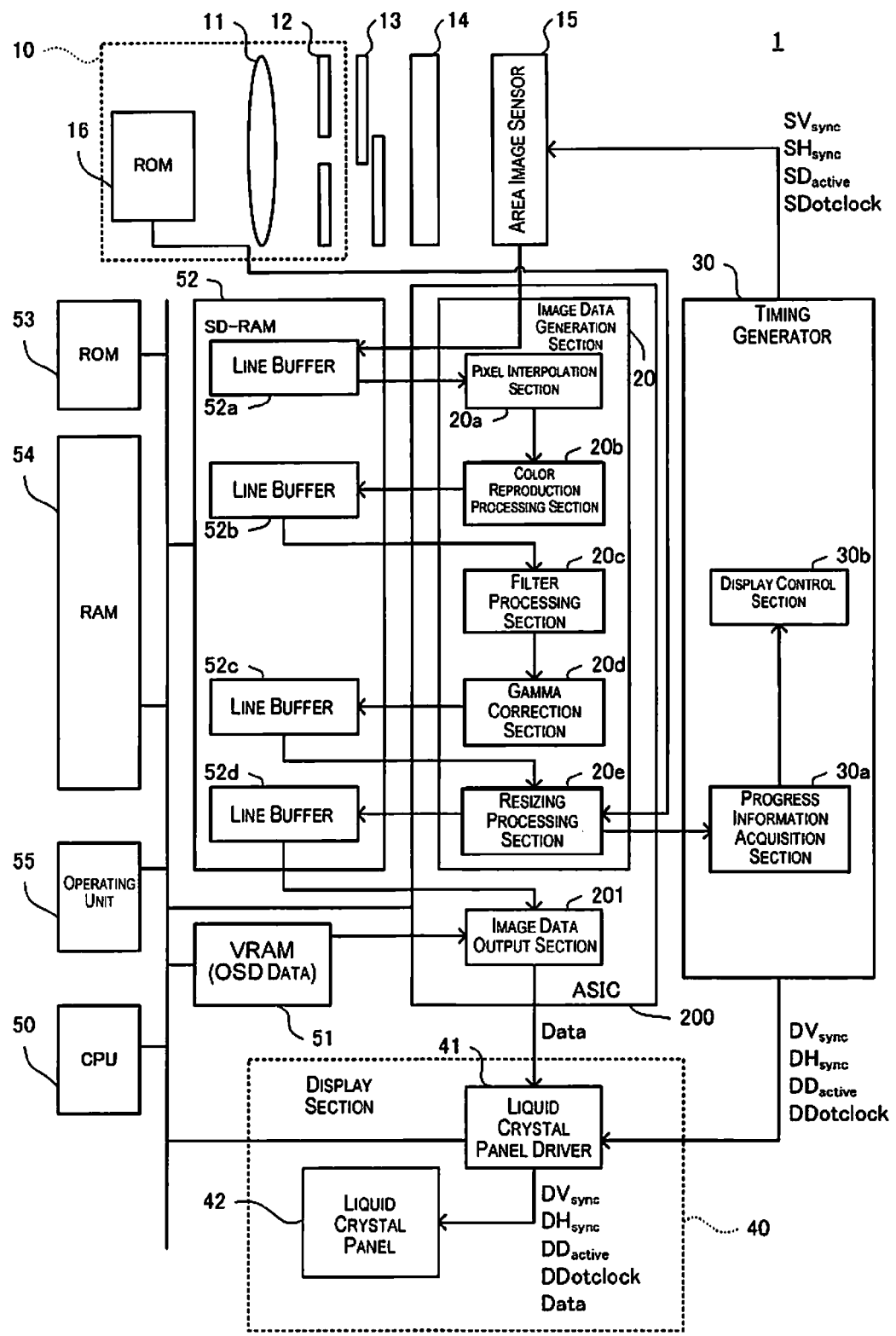
FIG. 1 is a block diagram pertaining to an embodiment of the present invention.

In FIG. 1, an image-capturing device 1 including a display control device according to an embodiment of the present invention has an interchangeable lens unit 10, a shutter 13, a low pass filter 14, an area image sensor 15 (corresponding to the image-capturing section), an ASIC 200, a timing generator 30, a display unit 40, a CPU 50, a VRAM 51, an SD-RAM 52, a ROM 53, a RAM 54, and an operating unit 55. The CPU 50 can use the VRAM 51, the SD-RAM 52, and the RAM 54 as appropriate to execute a program recorded in the ROM 53. Using this program, the CPU 50 executes a function for generating image data indicating a subject imaged by the area image sensor 15 according to an operation by the operating unit 55. The operating unit 55 has a shutter button, a dial switch as mode switching means for switching modes, a dial switch for switching a diaphragm and the shutter speed, and a push button for operating various setting menus. The user can give various instructions to the image-capturing device 1 by operating this operating unit 55.

The display unit 40 is an electronic view finder (EVF) for displaying an image representing a subject to be captured, to allow the user to ascertain the state of the subject and image-capturing conditions before images are captured. The image-capturing device 1 according to the present embodiment is a mirrorless digital camera having an EVF. The display unit 40 has an interface circuit (not shown), a liquid crystal panel driver 41, a liquid crystal panel 42, an eyepiece (not shown), and the like. In the present embodiment, the liquid crystal panel 42 is a high-temperature polysilicon thin film transistor (TFT) having three subpixels corresponding to a three-color filter for each pixel, and prescribes the location of a pixel by coordinates in an orthogonal coordinate system. A plurality of pixels arranged parallel to one coordinate axis comprises a line, and a plurality of lines is arranged parallel to the other coordinate axis. In the present specification, the direction parallel to a line is called horizontal, the direction perpendicular to a line is called vertical, and one screen comprising all of the pixels of the liquid crystal panel 42 is called one frame.

The liquid crystal panel driver 41 applies a voltage to the subpixels to output a signal to the liquid crystal panel 42 for driving the liquid crystals. The liquid crystal panel 42 has a gate driver and a source driver (not shown), an image being displayed by the gate driver controlling the display timing in the pixels of each line according to a signal outputted by the liquid crystal panel driver 41, and the source driver applying a voltage according to the image data of the pixels to the pixels of the line at a display timing. Specifically, the liquid crystal panel driver 41 is configured so as to output various signals for displaying an image on the liquid crystal panel 42; for example, a vertical synchronization signal (DVsync) for prescribing the time for displaying one frame, a horizontal synchronization signal (DHsync) for prescribing the time for displaying one frame, a data active signal (DDactive) for prescribing the time for reading the image data in each line, a data clock signal (DDotclock) for prescribing the timing and the like for reading the image data of each pixel, and the image data (Data) of each pixel.

The image-capturing device 1 according to the present embodiment has a timing generator 30 as a control section, and generates the vertical synchronization signal DVsync, the horizontal synchronization signal DHsync, the data active signal DDactive, and the data clock signal DDotclock using this timing generator 30. Specifically, the timing generator 30 has a display control section 30b having a clock division circuit and the like for synchronizing with a variable timing of a clock signal of a predetermined cycle outputted by clock signal generating means to generate a signal for varying the signal level. The timing generator 30 also generates the vertical synchronization signal DVsync, the data active signal DDactive, and the data clock signal DDotclock for varying the signal level at a predetermined timing under the control of the display control section 30b. In the present embodiment, the horizontal synchronization signal DHsync has a variable output timing, and this output timing is determined based on the processing result of a resizing section 20e to be described later.

The liquid crystal panel 42 in the present embodiment is a panel of XGA size having 1024 effective pixels horizontally and 768 effective pixels vertically. The content and output timing of the image data Data to be outputted by the liquid crystal panel driver 41 can be adjusted to display gradations according to the image data Data in any desired location. The liquid crystal panel 42 in the present embodiment displays a subject image in a predetermined area based on the output data of the area image sensor 15, and displays text indicating image-capturing conditions in a predetermined area. Specifically, the liquid crystal panel 42 displays an OSD display of text indicating image-capturing conditions together with the subject image. Although the liquid crystal panel 42 has more pixels than the number of effective pixels horizontally and vertically, for simplicity, processing of pixels other than the effective pixels will not be described in the present specification.

The interchangeable lens unit 10 has a lens 11, and a diaphragm 12 for forming a subject image on the area image sensor 15. The interchangeable lens unit 10 is attached to a case (not shown), and can be changed. The area image sensor 15 may be a solid-state image sensor, such as a complementary metal oxide semiconductor (CMOS) image sensor having a Bayer matrix color filter and a plurality of photodiodes for accumulating charges by photoelectric conversion for each pixel according to quantity of light, or a charge coupled device (CCD) image sensor. The pixel locations of the area image sensor 15 are prescribed by coordinates in an orthogonal coordinate system. A plurality of pixels arranged horizontal to one coordinate axis comprises a line, and a plurality of lines is arranged parallel to the other coordinate axis. In the present specification, the direction parallel to a line is called horizontal, and the direction perpendicular to a line is called vertical. One screen comprising some of the area image sensor 15 pixels of the area image sensor 15 is called one frame.

In the present embodiment, the operation of the area image sensor 15 is synchronized with various signals outputted by the timing generator 30. Specifically, the timing generator 30 outputs a vertical synchronization signal (SVsync) for prescribing the time for reading the detection results of the photodiodes for one frame, a horizontal synchronization signal (SHsync) for prescribing the time for reading the detection results of the photodiodes for one line, and a data clock signal (SDotclock) for prescribing the timing and the like for reading the image data of each pixel. The area image sensor 15 starts outputting output data for one frame according to the vertical synchronization signal SVsync, and successively reads the detection results of the photodiodes corresponding to some of the pixels of the area image sensor 15 at a timing according to the data clock signal SDotclock within the time prescribed by the horizontal synchronization signal SHsync.

The ASIC 200 has an image data generating section 20 comprising a circuit that uses line buffers 52a to 52d for a plurality of lines provided in advance in the SD-RAM 52 for processing by pipeline processing to generate image data for displaying a subject image on the display unit 40. This ASIC 200 may be an image-processing digital signal processor (DSP). The line buffers 52a to 52d for a plurality of lines may be disposed, for example, in the image data generating section 20. The display unit 40 displays a subject image on the liquid crystal panel 42 based on the generated image data. Specifically, the user can use the display unit 40 as an EVF to confirm the subject.

When the user has operated the operating unit 55 to give an instruction to capture an image, the area image sensor 15 starts to output output data for one frame according to the vertical synchronization signal SVsync following the image-capturing instructions, and successively reads output data indicating the detection results of the photodiodes corresponding to all of the effective pixels of the area image sensor 15 at a timing according to the data clock signal SDotclock within the time prescribed by the horizontal synchronization signal SHsync. The image data generating section 20 then uses the SD-RAM 52 or the like to generate image data in a format such as JPEG, and saves these image data in a removable memory or the like (not shown). Specifically, the user can generate image data indicating a subject image.

(2) Control of Horizontal Synchronization Signal

Figure 2:
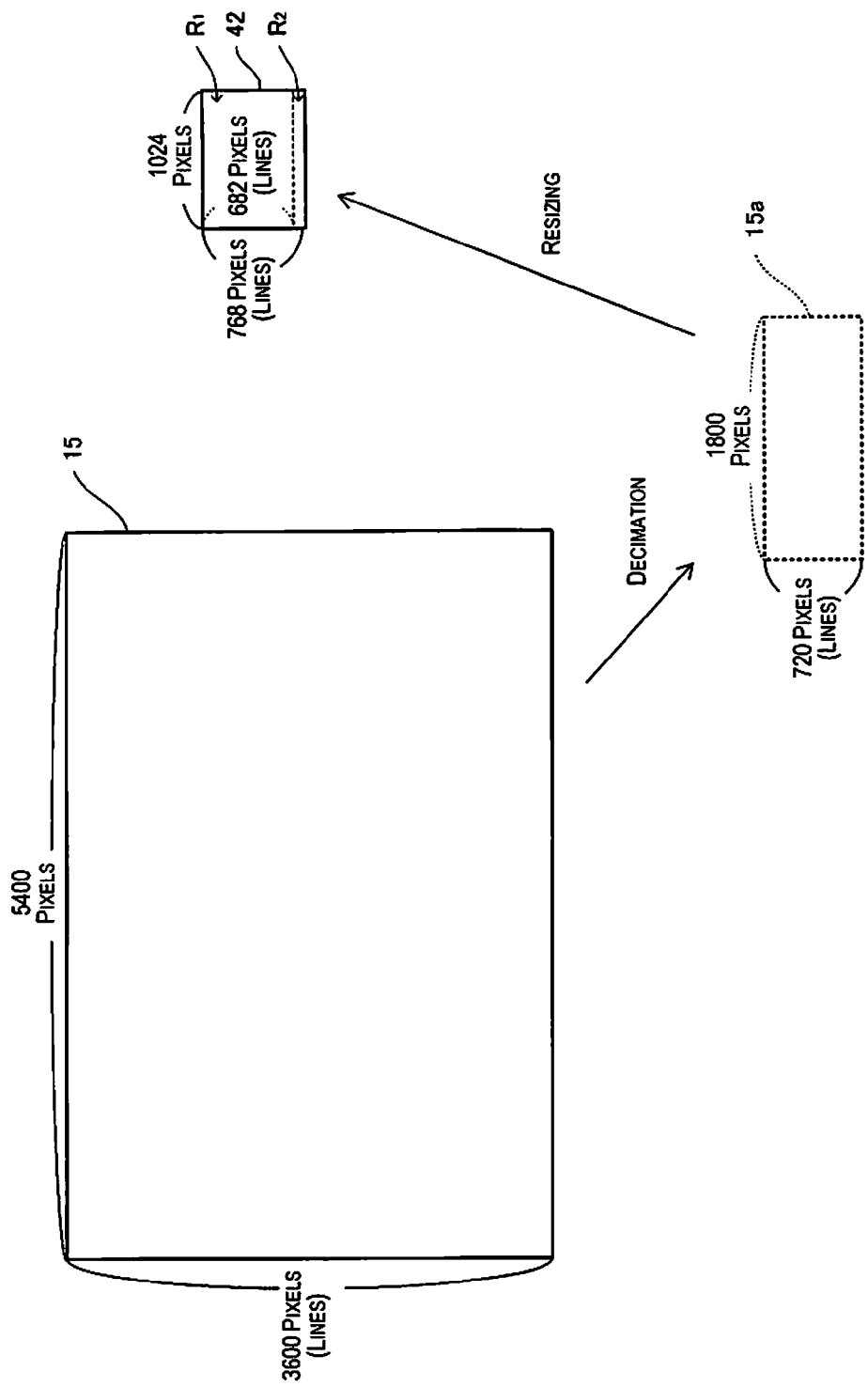
FIG. 2 is a diagram showing an area image sensor and the number of pixels of a liquid crystal panel.

In consideration of obtaining high quality image data when image data indicating a subject is saved in a removable memory or the like, printing the resulting image, or performing another action, the number of pixels of the area image sensor 15 is preferably greater than the predetermined number. Therefore, as shown in FIG. 2, the number of effective pixels of the area image sensor 15 in the present embodiment is 5400 pixels horizontally and 3600 pixels vertically. Although the area image sensor 15 has more pixels than the number of effective pixels horizontally and vertically, for simplicity, processing of pixels other than the effective pixels will not be described in the present specification.

As described earlier, the liquid crystal panel 42 has 1024 pixels horizontally and 768 pixels vertically, and displays a subject image in a predetermined area (subject image display area R1 shown in FIG. 2). In the present embodiment, to display a subject image as large as possible while maintaining the aspect ratio (2:3) of the area image sensor 15, the subject image display area R1 for displaying a subject image is a rectangular area having a 2:3 aspect ratio, the top, left, and right sides of which touch the top, left, and right sides of the liquid crystal panel 42. The remaining area (the information display area R2 shown in FIG. 2) is a display area for showing image-capturing conditions. Therefore, the subject image display area R1 for a subject in the liquid crystal panel 42 comprises 1024 pixels horizontally and 682 pixels vertically. Thus, the number of pixels of the area image sensor 15 matches the number of pixels of the liquid crystal panel 42 in the present embodiment.

Because the display on the display unit 40 will be used by the user to confirm a subject, if the delay from the timing when a subject is captured on the area image sensor 15 to the timing when the captured subject image is displayed on the display unit 40 is long enough to be perceptible by the user, the display functions highly undesirably as an EVF because, for example, the subject viewed on the EVF is offset from the saved subject image. Therefore, the delay is preferably short when using the display unit 40 as an EVF.

Thus, to display an image captured on the area image sensor 15 on the display unit 40 at a very short delay difficult to perceive by a human, the area image sensor 15 and the image data generating section 20 apply various types of processing in the present embodiment, and the display unit 40 displays the image data generated as a result of this processing at high speed.

Specifically, the area image sensor 15 according to the present embodiment has a circuit capable of reading and interlacing photodiode detection results at a rate of one of n lines arranged vertically (n is an odd number), and also has an adder for adding the detection results of m photodiodes arranged horizontally (m is a natural number) for photoelectrical conversion through color filters of the same color, and outputting 1/mth of this sum (i.e., the arithmetic mean of m detection results). When the display unit 40 functions as an EVF in the present embodiment, the configuration of interlacing and processing by the adder in the area image sensor 15 captures a subject at high speed by sampling pixels horizontally and vertically to output output data of fewer pixels than the number of pixels of the area image sensor 15.

Figure 3:
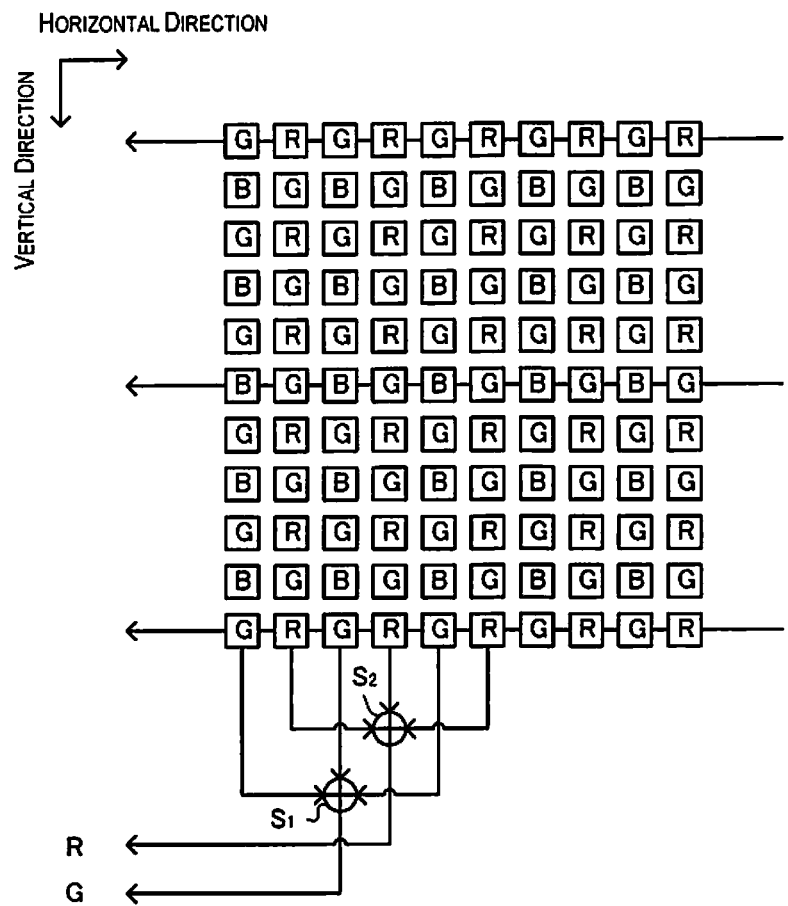
FIG. 3 is a diagram showing an example of a method for outputting image data of an area image sensor.

Specifically, in a live view mode in which the display unit 40 functions as an EVF, the area image sensor 15 reads the vertical lines to be read at a rate of one out of n lines according to the horizontal synchronization signal SHsync, processes the detection results of m photodiodes by the adder, and outputs the resulting arithmetic mean as output data according to the data clock signal SDotclock. FIG. 3 shows an example of a method in the present embodiment for outputting fewer pixels than the number of pixels of the area image sensor 15. In FIG. 3, boxes labeled R indicate color filters allowing light of the red band to pass through, boxes labeled G indicate color filters allowing light of the green band to pass through, and boxes labeled B indicate color filters allowing light of the blue band to pass through.

Because a filter of just one color corresponds to each pixel when the color filters of pixels indicated by boxes form a Bayer matrix as shown in FIG. 3, the color of each pixel must be interpolated from the surrounding pixels. Therefore, when thinning lines to acquire output data, thinning must be carried out so that the color filters of adjacent lines after thinning are different colors. Therefore, in the present embodiment, output data capable of specifying the colors of each pixel must be acquired by interpolating when n is an odd number and detection results for photodiodes are acquired at a rate of one out of n lines. In the present embodiment, output data are acquired at a rate of one line in five lines such that the number of lines of the area image sensor 15 vertically approximates as much as possible the number of lines of the subject image display area R1 of the liquid crystal panel 42 vertically. Acquiring output data at a rate of one line in five lines is shown in FIG. 3 by the arrows pointing left. The number of lines vertically in this example is 1/5; that is, 720.

When the color filter is a Bayer matrix, horizontally adjacent pixels differ in color, and color filters of the same color are arranged at every other pixel. Therefore, thinning can be essentially accomplished by adding every other pixel for m pixels arranged horizontally and multiplying the sum by 1/m (that is, finding the arithmetic mean of m detection results). In the present embodiment, m is set as 3 due to constraints in terms of image quality and the like when adding by an adder. In the line shown closest to the bottom in FIG. 3, an adder S1 adds detection results for three photodiodes that are photodiodes for photoelectrically converting through green color filters and are arranged horizontally, and an adder S2 adds detection results for three photodiodes that are photodiodes for photoelectrically converting through red color Filters and are arranged horizontally. In this example, the number of pixels horizontally is ⅓; i.e., 1800 pixels. FIG. 2 shows the data size in the area image sensor 15 after thinning as a box 15*a* outlined by dotted lines.

Thus, the number of lines vertically in the area image sensor 15 can be made 720 lines, and the number pixels horizontally can be made 1800 pixels. During this thinning, however, n vertically is an odd number and m horizontally is constrained in terms of image quality to a natural number, making it difficult to match the number of pixels after thinning to the number of pixels of the subject display area R1 of the liquid crystal panel 42. This difference between n and m also gives the subject and the subject image on the liquid crystal panel 42 different aspect ratios.

Therefore, in the present embodiment, the output data after thinning are resized in the image data generating section 20 to generate image data for displaying in the subject image display area R1 of the liquid crystal panel 42. Specifically, the image data generating section 20 has a pixel interpolating section 20*a*, a color reproducing section 20*b*, a filter processing section 20*c*, a gamma correcting section 20*d*, a resizing section 20*e*, and an image data output section 20*f*. The resizing section 20*e* changes the number of pixels vertically and horizontally in the course of generating image data to generate image data equal to the number of pixels of the subject image display area R1 of the liquid crystal panel 42. In the present embodiment, distortion correction is also applied during resizing to eliminate distortion caused by the optical properties of the lens 11 of the interchangeable lens unit 10.

The line buffer 52*a* is a buffer memory for temporarily storing the output data after thinning outputted by the area image sensor 15. When output data after thinning are outputted by the area image sensor 15, these output data are temporarily stored in the line buffer 52*a* for processing by the image data generating section 20. The pixel interpolating section 20*a* interpolates while reading the data of the number of pixels required to generate the two channels of colors omitted by each pixel in a Bayer matrix from the line buffer 52*a* to generate these two channels of colors. As a result, three channels of data are generated in each pixel. Next, the color reproducing section 20*b* applies color conversion processing to match colors by calculating a 3×3 matrix based on the generated data. The static data generated by color conversion processing are temporarily stored in the line buffer 52*b*. Next, the filter processing section 20*c* adjusts sharpness, removes noise, and the like by filter processing. Next, the gamma correcting section 20*d* applies gamma correction to eliminate the difference in characteristics between colors indicating the gradation levels of the output data of the area image sensor 15 and colors indicating the gradation levels of the image data to be handled by the display unit 40. The output data generated by gamma correction are temporarily stored in the line buffer 52*c*.

The number of pixels stored in this line buffer 52*c* for each line; i.e., line by line, is the number of pixels thinned in the area image sensor 15. Specifically, data of 720 lines vertically and 1800 pixels horizontally are stored line by line. The resizing section 20*e* successively refers to the data stored in this line buffer 52*c* and applies an interpolation calculation processing to convert the output data after thinning to image data of the number of pixels of the subject display area R1 (1024 pixels horizontally and 682 pixels vertically), and corrects to eliminate distortion caused by the optical properties of the lens 11.

Resizing is a process for determining the gradation levels of the channels corresponding to each pixel of the subject display area R1 line by line. Specifically, a reference area for each pixel of the subject display area R1 is specified in the output data after thinning, and interpolation calculation processing is applied based on the gradation levels of the channels indicated by a reference pixel belonging to this reference area. For example, bicubic, bilinear, or other similar interpolation may be employed for the interpolation calculation processing. The relationship between each pixel of the subject display area R1 and the location of the reference area in the output data after thinning is specified based on distortion data read from the ROM 16 of the interchangeable lens unit 10. A plurality of distortion data may be prepared in advance for a single interchangeable lens unit 10, or read according to the zoom and/or focus state of the interchangeable lens unit 10. It is possible for only the machine type of the interchangeable lens unit 10 to be read from the ROM 16 of the interchangeable lens unit 10, and the CPU 50 may generate distortion data corresponding to the machine type, which may be read from the ROM 53.

FIGS. 4A and 4B are diagrams illustrating barrel aberration and pincushion aberration. Barrel aberration causes an image to appear with distortion curves bulging toward the periphery (with the image-capturing device 1 held horizontal, imaged horizontal lines appearing as horizontal distortion curves of and imaged vertical lines appearing as vertical distortion curves), and pincushion aberration causes an image to appear with distortion curves shrinking toward the center. In the present embodiment, distortion having axial symmetry to the vertical and horizontal center axes will be described. In both barrel aberration and pincushion aberration, the width of distortion increases vertically moving toward the center of the horizontal distortion curves. Also in both barrel aberration and pincushion aberration, the width of distortion increases as the horizontal distortion curves approach the vertical edges. The width of vertical distortion at the center of the horizontal distortion curves is expressed as $\beta$, and the width of distortion $\beta$ of the horizontal distortion curves on both edges vertically is especially expressed as $\beta$max.

The distortion data read from the ROM 16 are data indicating the relationship between the pixels of the subject display area R1 and the locations of reference areas RaN set in the output data after thinning. FIGS. 4A and 4B show the center of gravity locations of the reference areas RaN (Ra1, Ra341, Ra682) set corresponding to each pixel after resizing the first (N=1) line, the middle (N=341) line, and the last (N=682) line in the subject display area R1. When the pixels of the object to be resized at each line in the subject display area R1 are shifted as shown by arrows A1, A341, and A682, the center of gravity locations of the reference areas RaN (Ra1, Ra341, Ra682) are shifted along the tracks of the arrows A1, A341, and A682. The distortion data prescribe the relationship between the pixels of the subject display area R1 and the locations of the reference areas RaN such that the shape of these tracks match the shape of the horizontal distortion curves. N is an integer from 1 to 682, and refers to a line number indicating the processing sequence of the generation processing and the display processing for each line in the subject display area R1. The reference areas RaN are squares measuring $\alpha$ (pixel) horizontally and vertically. M is an integer from 1 to 720 matching the number of lines vertically before interpolation calculation processing, and refers to a line number indicating the sequence in which the output data of each line after thinning one frame are buffered in the line buffer 52*c*. The vertical lines before interpolation calculation processing match the lines of the last step, and the gamma correcting section 20*d* for generating output data for each line in the last step corresponds to the last step.

During interpolation calculation processing, the gradation level indicated by each pixel of the subject display area R1 is determined by the gradation level near the gradation level indicated by each pixel of the reference area RaN in the corresponding location. Specifically, in conceptual terms, each pixel on the distortion curves in the image indicated by the output data is arranged on a straight line in the subject display area R1. Thus, setting reference areas RaN in locations along the horizontal distortion curves enables conversion to image data of the number of pixels of the subject display area R1 after correcting to eliminate distortion.

Parallel to buffering the output data after thinning in the line buffer 52*c* in order of lines starting from the line on the top edge vertically (M=1) as described earlier, the output data are resized in order of lines starting from the line on the top edge vertically (N=1). When resizing the lines in the subject display area R1, the output data (after thinning) of the lowermost reference pixels vertically of the reference pixels belonging to the reference areas RaN set for these lines (hereafter called the lowermost reference pixels; the reference areas RaN (Ra1, Ra341, Ra682) to which the lowermost reference pixel belongs are indicated in FIGS. 4A and 4B by hatching. For lines where horizontal distortion curves bulge upward in the case of barrel aberration, such as N=1, there are two reference areas RaN to which the lowermost reference pixels belong, one on each of the left and right edges, but the reference area RaN to which the lowermost reference pixel on the right belongs has been omitted in FIG. 4 for simplicity) must be buffered in the line buffer 52c. This is because interpolation calculation processing cannot be applied to all of the pixels of these lines as long as the output data (after thinning) of the pixels belonging to the reference areas RaN have not been buffered. Therefore, applying interpolation calculation processing to each line produces a buffer wait time until the output data required for interpolation calculation processing of each line is buffered in the line buffer 52c.

Next, the buffer wait time in the case of barrel aberration will be described. As shown in FIG. 4A, in barrel aberration, the center of gravity locations of the reference areas RaN are set within a barrel area enclosed by two left and right vertical distortion curves and two upper and lower horizontal distortion curves inside the four sides of a square (indicated by the dashed and double-dotted line) just inside the outer edges of the image indicated by the output data by one-half the width ($\alpha/2$) of the reference areas RaN. Because the horizontal distortion curves bulge upward in the upper half of the image indicated by the output data in the case of barrel aberration, the lowermost reference pixel for the first (N=1) line in the subject display area R1 is the lowermost pixel of the pixels belonging to the reference area Ra1 set at the edge of the horizontal distortion curves. Therefore, the lowermost reference pixel for the first (N=1) line in the subject display area R1 belongs to the M1=($\alpha$+$\beta$max) line in the output data after thinning. Therefore, interpolation calculation processing can be applied to the first (N=1) line after waiting for the output data for just M=1 to M1 to be buffered in the line buffer 52c. The number of lines of output data after thinning to be buffered in the first and last (N=1, 682) lines in the subject display area R1 is a maximum of ($\alpha$+$\beta$max), and the line buffer 52c preferably has a capacity for buffering a minimum of the output data of ($\alpha$+$\beta$max) lines.

The end of interpolation calculation processing of the $N^{th}$ line produces a buffer wait time until the output data for the line containing the lowermost reference pixel for the $(N+1)^{th}$ line is buffered in the line buffer 52c. Because the output data of the line to which the lowermost reference pixel for the $N^{th}$ line belongs and the line above this line vertically are already buffered in the line buffer 52c, these data can be referenced on the spot during interpolation calculation processing of the $(N+1)^{th}$ line. Specifically, the buffer wait time for the $(N+1)^{th}$ line ends when the output data for the line matching the difference between the vertical location of the lowermost reference pixel for the $(N+1)^{th}$ line and the vertical location of the lowermost reference pixel for the $N^{th}$ line is first buffered in the line buffer 52c.

In the present embodiment, as shown in the enlarged drawing of FIG. 4A, there is a predetermined vertical displacement $\Delta Y$ vertically between the horizontal distortion curve for which the center of gravity location of the reference area RaN is set for the $N^{th}$ line, and the horizontal distortion curve for which the center of gravity location of the reference area RaN+1 is set for the $(N+1)^{th}$ line. Specifically, the horizontal distortion curve is lower by a factor of the vertical displacement $\Delta Y$ from the horizontal distortion curve corresponding to the $N^{th}$ line is the horizontal distortion curve corresponding to the $(N+1)^{th}$ line. In barrel aberration, the vertical locations of the horizontal edges of the horizontal distortion curves are the reference for the vertical displacement $\Delta Y$.

Because the horizontal distortion curve in the upper half of the image indicated by the output data bulges upward in barrel aberration, the lowermost reference pixels belong to the reference areas RaN (Ra1 to Ra341) set at the edge of the horizontal distortion curve. Specifically, the lowermost reference pixels belong to the reference areas RaN (Ra1 to Ra341) set at the edge of the horizontal distortion curve to which the vertical displacement $\Delta Y$ was applied. Therefore, the vertical location of the lowermost reference pixel for the $(N+1)^{th}$ line is shifted downward by a factor of the vertical displacement $\Delta Y$ from the vertical location of the lowermost reference pixel for the $N^{th}$ line.

That is, applying interpolation calculation processing to the $(N+1)^{th}$ (N=2 to 341) line in the upper half of the subject display area R1 produces a buffer wait time until the output data for the number of lines corresponding to the vertical displacement $\Delta Y$ are buffered in the line buffer 52c.

Because the horizontal distortion curve in the lower half of the image indicated by the output data bulges downward, the lowermost reference pixels belong to the reference areas RaN (Ra342 to Ra682) set at the center of the horizontal distortion curve. In this case, the vertical location of the lowermost reference pixel for the $(N+1)^{th}$ line is not limited to shifting downward by a factor of the vertical displacement $\Delta Y$ from the vertical location of the lowermost reference pixel of the $N^{th}$ line. Specifically, the vertical locations of the lowermost reference pixels are shifted downward by a factor of a vertical displacement ($\Delta Y+\Delta \beta$) in which the difference $\Delta \beta$ in the width of distortion $\beta$ between the horizontal distortion curve corresponding to the $N^{th}$ line and the horizontal distortion curve corresponding to the $(N+1)^{th}$ line is added to the vertical displacement $\Delta Y$. This is because the lowermost reference pixels belong to the areas RaN (Ra342 to Ra682) set at the center of the horizontal distortion curve located below the edge of the horizontal distortion curve to which the vertical displacement $\Delta Y$ was applied by a factor of the width of distortion $\beta$.

Therefore, applying interpolation calculation processing to the $(N+1)^{th}$ (N=342 to 682) line in the lower half of the subject display area R1 produces a buffer wait time until the output data of the number of lines corresponding to the vertical displacement ($\Delta Y+\Delta \beta$) are buffered in the line buffer 52c. Because the width of distortion $\beta$ increases monotonically in barrel aberration the lower the vertical location of the horizontal distortion curve is in the lower half area, the difference $\Delta \beta$ in the width of distortion $\beta$ is always positive. Therefore, the vertical displacement ($\Delta Y+\Delta \beta$) of the lowermost reference pixel>$\Delta Y$. That is, the buffer wait time when applying interpolation calculation processing to the lines of the lower half of the subject display area R1 is longer than the buffer wait time when applying interpolation calculation processing to the lines of the upper half of the subject display area R1.

Next, the buffer wait time in the case of pincushion aberration will be described. In pincushion aberration, the center of gravity locations of the reference areas RaN are set within a pincushion area enclosed by two left and right vertical distortion curves and two upper and lower horizontal distortion curves inside the four sides of a square (indicated by the dashed and double-dotted line) just inside the outer edges of the image indicated by the output data by one-half the width (α/2) of the reference areas RaN. Because the horizontal distortion curves bulge downward in the upper half of the image indicated by the output data in the case of pincushion aberration, the lowermost reference pixel for the first (N=1) line in the subject display area R1 is the lowermost pixel of the pixels belonging to the reference area Ra1 set at the center of the horizontal distortion curves. Therefore, the lowermost reference pixel for the first (N=1) line in the subject display area R1 belongs to the M1=(α+βmax) line in the output data after thinning, as in the case in barrel aberration. Therefore, in pincushion aberration as well, interpolation calculation processing can be applied to the first (N=1) line after waiting for the output data for just M=1 to M1 to be buffered in the line buffer 52*c*.

When interpolation calculation processing of the $N^{th}$ line ends, there is a buffer wait time until the output data for the line containing the lowermost reference pixel for the $(N+1)^{th}$ line is buffered in the line buffer 52*c*.

In pincushion aberration as well, as shown in the enlarged drawing of FIG. 4B, there is a predetermined vertical displacement ΔY vertically between the horizontal distortion curve for which the center of gravity location of the reference area RaN is set for the $N^{th}$ line, and the horizontal distortion curve for which the center of gravity location of the reference area RaN+1 is set for the $(N+1)^{th}$ line. In pincushion aberration, however, the vertical locations of the centers of the horizontal distortion curves are the reference for the vertical displacement ΔY.

Because the horizontal distortion curve in the upper half of the image indicated by the output data bulges downward in pincushion aberration, the lowermost reference pixels belong to the reference areas RaN (Ra1 to Ra341) set at the center of the horizontal distortion curves. Therefore, the vertical location of the lowermost reference pixel for the $(N+1)^{th}$ line is shifted downward by a factor of the vertical displacement ΔY from the vertical location of the lowermost reference pixel for the $N^{th}$ line.

Therefore, as in the case of barrel aberration, applying interpolation calculation processing to the $(N+1)^{th}$ (N=2 to 341) line in the upper half of the subject display area R1 produces a buffer wait time until the output data for the number of lines corresponding to the vertical displacement ΔY are buffered in the line buffer 52*c*

Because the horizontal distortion curve in the lower half of the image indicated by the output data bulges upward, the lowermost reference pixels belong to the reference areas RaN (Ra342 to Ra682) set at the edges of the horizontal distortion curve. In this case, the vertical locations of the lowermost reference pixels are shifted downward by a factor of a vertical displacement (ΔY+Δβ) in which the difference Δβ in the width of distortion β between the horizontal distortion curve corresponding to the $N^{th}$ line and the horizontal distortion curve corresponding to the $(N+1)^{th}$ line is added to the vertical displacement ΔY. Because the width of distortion β increases monotonically in pincushion aberration the lower the horizontal distortion curve is in the lower half area, the difference Δβ in the width of distortion β is always positive. Therefore, in pincushion aberration as well, the vertical displacement (ΔY+Δβ) of the lowermost reference pixel>ΔY, and the buffer wait time when applying interpolation calculation processing to the lines (N=342 to 682) of the lower half of the subject display area R1 is longer than the buffer wait time when applying interpolation calculation processing to the lines (N=2 to 341) of the upper half of the subject display area R1.

As described earlier, in both barrel aberration and pincushion aberration, the buffer wait time is longest for the first (N=1) line, and the buffer wait time for applying interpolation calculation processing to the lines (N=342 to 682) of the lower half of the subject display area R1 is longer than the buffer wait time for applying interpolation calculation processing to the lines (N=2 to 341) of the upper half of the subject display area R1. That is, the buffer wait time during resizing in the present embodiment varies according to the position of the line in the subject display area R1.

When the vertical displacement ΔY is constant and the difference Δβ in the width of distortion β is constant (the width of distortion β is a linear function of N), the buffer wait time for the lines of the upper half and the buffer wait time for the lines of the lower half are both constant, and the buffer wait time increases when N=341→342. When vertical displacement is not constant or the width of distortion β is nonlinear, the buffer wait time for the lines varies continuously. In either case, the buffer wait time during resizing associated with distortion correction varies according to the location of the line in the subject display area R1. The width α of the reference area RaN vertically and horizontally need not be constant, and may be, for example, proportional to the width of distortion β. In this case, the difference between the width α of the reference area RaN for the $N^{th}$ line and the width α of the reference area RaN the $(N+1)^{th}$ line will influence the buffer wait time.

Figure 5:
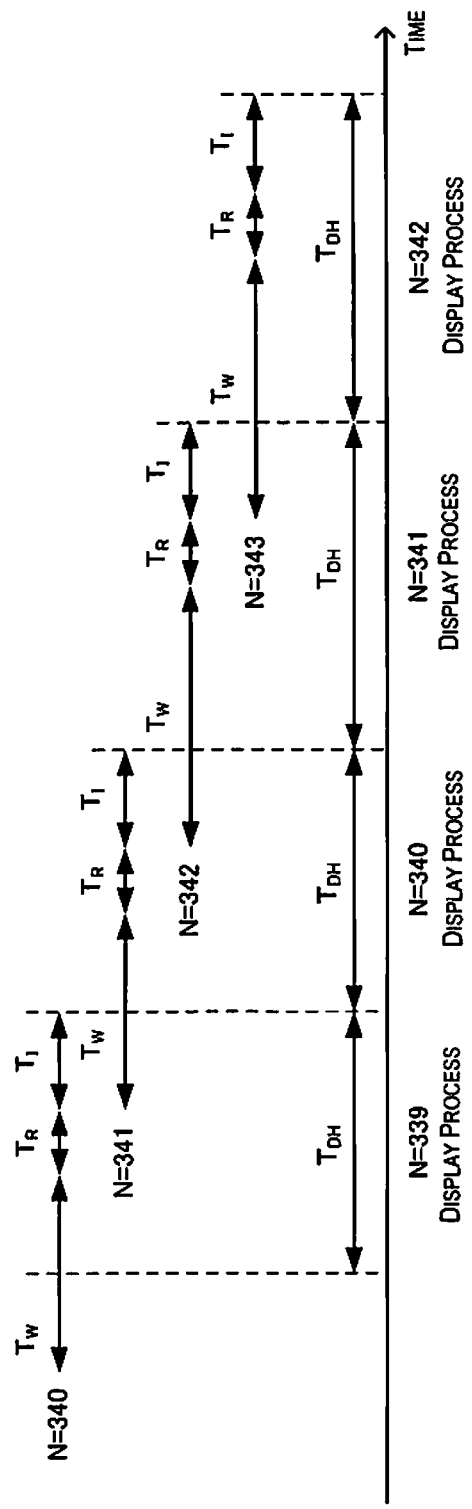
FIG. 5 is a resizing timing chart.

FIG. 5 is a timing chart illustrating the timing when resizing ends. As shown in FIG. 5, output data after thinning are generated and the output data are written in the line buffer 52*c* for these generated output data during a buffer wait time TW for each line, and after the buffer wait time TW has elapsed, a reading time TR starts for reading the output data from the line buffer 52*c*. This reading time TR is constant for each line. When the reading time TR ends, interpolation calculation processing is applied during an interpolation calculating time TI. The number of pixels belonging to each line of the subject display area R1 is the same, and the interpolation calculating time Ti required for interpolation calculation processing is essentially constant. As shown in FIG. 5, the buffer wait time TW for the next $(N+1)^{th}$ line starts at the timing when reading for the $N^{th}$ line ends. Because the interpolation calculating time TI is shorter than the total of the buffer wait time TW and the reading time TR in the present embodiment, the buffer wait time TW governs the time required to resize each line. As shown in FIG. 5, the buffer wait time TW between the 342th and the 343th lines is longer than the buffer wait time TW between the 340th and the 341th lines. The tendency of the buffer wait time TW described earlier is largely dependent on the operating state, such as the distortion characteristics of the lens 11 of the interchangeable lens unit 10 or the zoom magnification. In particular, the buffer wait time TW becomes significantly uneven at greater widths of distortion β of the lens 11.

The image data generated by resizing by the resizing section 20*e* are thus stored line by line in the line buffer 52*d*.

The ASIC 200 has an image data output section 201. The image data output section 201 outputs the image data (Data) for the 1st to the 682nd lines belonging to the subject display area R1 of the liquid crystal panel 42 to the display unit 40. When the image data for the last (N=682) line in the subject image display area R1 are outputted to the display unit 40, the OSD data stored in the VRAM 51 are read line by line, and these OSD data are outputted to the display unit 40 line by line as the image data for the 683rd to the 768th lines. Because the image data output section 201 simply outputs the image data for the 1st to the 682nd lines to the downstream display unit 40 without reworking, the image data output section 201 successively outputs the image data for the 1st to the 682nd lines at a very short delay after the timing when the resizing shown in FIG. 5 ends. Therefore, the timing when the image data output section 201 finishes the last generation processing for the 1st to the 682nd lines can be viewed as the same as the timing when the resizing shown in FIG. 5 ends. That is, the processing time of the last step of the generation processing of image data (processing by the image data output section 201) in the present embodiment is fast enough so as to be disregarded, and because this processing time is constant for each line, progress information may be obtained for resizing, which is the step before the last step. Needless to say, the step that is the main factor in the time required for the generation processing of each line during the generation processing of image data in the present embodiment is resizing. Therefore, progress information may be obtained for any step following resizing.

The timing when the image data output section 201 finishes the generation processing for the 683rd to the 768th lines is unrelated to resizing. OSD data indicating an image depicting text showing image-capturing conditions or the like are prepared in advance and stored in the VRAM 51 regardless of the subject to be captured by the area image sensor 15. The OSD data correspond to the information display area R2 in the liquid crystal panel 42, and comprise 1024 pixels horizontally and 85 pixels vertically. The time required for the synthetic display section 20f to display image data for the 683rd to the 768th lines on the display unit 40 line by line is essentially just the time required to read the data of one line from the VRAM 51, which is constant for each line of the information display area R2, and shorter than the time required for the subject image display area R1.

When image-capturing conditions or the like have changed, the OSD data must also be updated, but this image has a lower update frequency that the subject image based on the output data of the area image sensor 15. Because the synthetic display section 20f outputs image data indicating the subject image for the 1st to the 682nd lines and an image indicating image-capturing conditions or the like as the 683rd to the 768th lines, the subject image is synthesized with an image indicating the image-capturing conditions or the like.

In the present embodiment, the processing described earlier applies the generation processing for generating image data that can be displayed in the subject image display area R1 of the liquid crystal panel 42 based on the output data of the area image sensor 15, but the output data of the area image sensor 15 after thinning are 720 lines vertically, which is different from 682 lines, which is the number of lines of image data (subject display area R1) vertically, or 768 lines, which is the number of lines of the liquid crystal panel 42 vertically. That is, the number of lines required for capturing images and displaying images corresponding to a single frame is different.

Therefore, in the present embodiment, the horizontal synchronization signal SHsync, the vertical synchronization signal SVsync, the data active signal SDactive, and the data clock signal SDotclock of the area image sensor 15 are set to the cycle required for driving the area image sensor 15. Specifically, the timing generator 30 interpolates and/or resizes vertically as described earlier in the area image sensor 15 to output the horizontal synchronization signal SHsync at a timing and output frequency at which image data after resizing the number of lines of one frame (N=1 to 682) can be acquired within a time prescribed by the vertical synchronization signal SVsync. The timing generator 30 also outputs the data clock signal SDotclock at a timing at which the image data of the number of pixels of one frame can be acquired within a time prescribed by the horizontal synchronization signal SHsync as described earlier.

To minimize the delay time for displaying on the liquid crystal panel 42 based on output data outputted line by line by this area image sensor 15, the present embodiment has been configured so as to output the horizontal synchronization signal DHsync at the timing when the process for generating the image data for displaying on the lines belonging to the subject display area R1 of the liquid crystal panel 42 has ended. Specifically, in the present embodiment, the liquid crystal panel 42 can display lines for which processing by the image data output section 201 has ended. Therefore, the timing generator 30 outputs the horizontal synchronization signal DHsync for the display processing for the $N^{th}$ line at the timing when the process for generating the image data for the $N^{th}$ (N=1 to 682) line of the liquid crystal panel 42 vertically has ended. That is, the end of the generation processing of image data for the $N^{th}$ (N=1 to 682) line triggers the start of the display processing for the $N^{th}$ line.

Specifically, the timing generator 30 has a progress information acquisition section 30a, and this progress information acquisition section 30a can acquire progress information from the resizing section 20e indicating the lines for which resizing has ended. Because the timing at which resizing ends and the timing when the image data output section 201 finished the final generation processing can be viewed as the same as described earlier, the lines that can be displayed on the liquid crystal panel 42 can be specified based on this progress information. Therefore, the timing generator 30 outputs the horizontal synchronization signal DHsync synchronized with the timing when the process for generating the image data of each line ended, to start displaying the lines for which the generation processing of these image data has ended on the liquid crystal panel 42. According to this configuration, each line can be displayed as soon as the generation processing of each line ends without starting display of each line before the process for generating the image data has ended.

Because the pixels of the lines of the liquid crystal panel 42 can be displayed on the liquid crystal panel 42 within the horizontal synchronization time prescribed by the output timing of the horizontal synchronization signal DHsync, the timing generator 30 outputs the data active signal DDactive and the data clock signal DDotclock so as to allow the pixels for one line to be displayed within a time when the horizontal synchronization time prescribed by the output timing of the horizontal synchronization signal DHsync is assumed to be the shortest.

In the present embodiment, the vertical synchronization signal SVsync of the area image sensor 15 and the vertical synchronization signal DVsync of the liquid crystal panel 42 are synchronized to prevent the output data from the area image sensor 15 and display by the liquid crystal panel 42 not conforming to frame units. That is, the timing generator 30 outputs the vertical synchronization signal DVsync of the display unit 40 a predetermined time after the timing when the vertical synchronization signal SVsync of the area image sensor 15 was outputted. As a result, in the present embodiment, the cycles of the vertical synchronization signals SVsync and DVsync are the same and constant. Therefore, there is no need to delay the subject captured by the area image sensor 15 for at least one vertical synchronization time before displaying on the liquid crystal panel 42, or to display subject images captured at the same timing on the liquid crystal panel 42 over a plurality of frames.

Because the horizontal synchronization time prescribed by the horizontal synchronization signal DHsync of the liquid crystal panel 42 is of variable length in the present embodiment, the cycles of the vertical synchronization signals SVsync and DVsync remain the same and constant even if the horizontal synchronization time changes. Specifically, the timing generator 30 increases or shortens the horizontal synchronization time relative to a predetermined reference time TH to cancel out variation in time since the reference time TH, and control the output signals such that the vertical synchronization time for displaying one frame is constant. The reference time TH, for example, comprises the horizontal synchronization time when displaying each line at an equal timing for all lines of the liquid crystal panel 42 within the vertical synchronization time.

Output of the horizontal synchronization signal DHsync waits until process for generating the image data for each line in the subject display area R1 has ended. That is, the end of generation processing of image data for each line triggers the start of the display processing. As a result, the horizontal synchronization time (display processing time) is of variable length. Because the end of the generation processing of image data for each line triggers the start of the display processing, the display processing for the $N^{th}$ line starts essentially simultaneously with the end of the generation processing for the $N^{th}$ line, then the display processing for the $(N+1)^{th}$ line starts essentially simultaneously with the end of the generation processing for the $(N+1)^{th}$ line. Therefore, the shorter the time from the end of the generation processing for the $N^{th}$ line to the end of the generation processing for the $(N+1)^{th}$ line, the shorter the time from the end of the generation processing for the $N^{th}$ line to the start of the display processing for the $(N+1)^{th}$ line. Conversely, the longer the time from the end of the generation processing for the $N^{th}$ line to the end of the generation processing for the $(N+1)^{th}$ line, the longer the time from the end of the generation processing for the $N^{th}$ line to the start of the display processing for the $(N+1)^{th}$ line.

Figure 6:
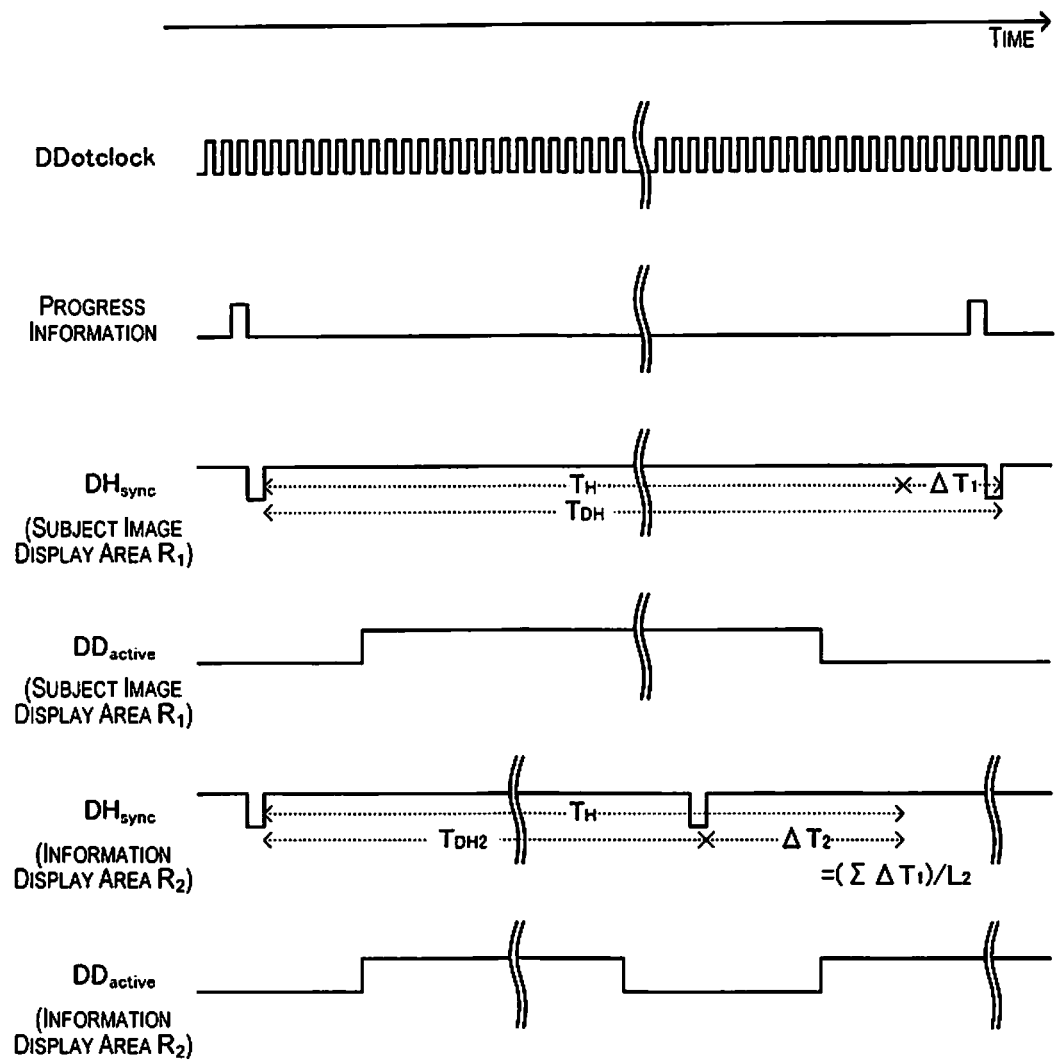
FIG. 6 is a timing chart of signals applied to a display unit according to the present embodiment.

FIG. 6 shows the horizontal synchronization signal DHsync outputted by the timing generator 30, together with the data active signal DDactive, the data clock signal DDotclock, and progress information. In the present embodiment, the progress information outputted by the resizing section 20e comprises a cyclical pulse which maintains a low-level output during the course of the process for generating the image data for one line, and becomes high level for a predetermined time when the process for generating the image data for one line has ended.

Once the timing generator 30 has acquired this progress information using the progress information acquisition section 30a, the processing of the display control section 30b outputs the horizontal synchronization signal DHsync synchronized with the pulse of this progress information. Therefore, in the event that the process for generating the image data of a given line does not end within the reference time TH, the horizontal synchronization signal DHsync is not outputted until the generation processing has ended. The horizontal synchronization time TDH is also longer than the reference time TH. Therefore, in the event that the process for generating the image data of a given line has not ended within the reference time TH, the process for displaying this line on the liquid crystal panel 42 does not start until the generation processing has ended, and the display processing does not start before preparation of the image data of each line has ended. Because the horizontal synchronization signal DHsync is outputted when the process for generating the image data of a given line ends, the display processing also starts without delaying until preparation of the image data of each line has ended. It is preferred, as in the present embodiment, for application to be made in a mode in which distortion correction is performed to prevent there being a constant period of timing for the ending of the process for generating the image data for one line to be displayed in the subject display area R1 of the liquid crystal panel 42, in order to drive the liquid crystal panel 42 in a state in which the horizontal synchronization time TDH can vary from the reference time TH, as described above.

Fluctuation in the buffer wait time TW during resizing, which is the main factor contributing to the cycle of the timing when the generation processing ends not being constant, is largely dependent on the operating state, such as the distortion characteristics of the lens 11 of the interchangeable lens unit 10 or the zoom magnification. When the timing generator 30 has been confirmed such that the end of the generation processing of image data for each line triggers the start of the display processing even under these circumstances, in the event that the variation tendency of the buffer wait time TW changes due to changing the interchangeable lens unit 10 or modifying the zoom magnification or the like, the horizontal synchronization time TDH can be set to track the change in this variation tendency. Therefore, an image-capturing device 1 in which the interchangeable lens unit 10 is interchangeable is advantageous for applying the configuration of the present embodiment. As shall be apparent, the present invention can also be applied to a mode in which the processing speed can be changed by line depending on the image-capturing conditions. For example, the present invention can be applied to a configuration in which the user operates the operating unit 55 to vary the vertical synchronization time or the horizontal synchronization time of the area image sensor 15, or the cycle of the timing when the process for generating the image data ends is not constant. The present invention can also be applied to a configuration in which changing a removable EVF varies the vertical synchronization time or the horizontal synchronization time of the area image sensor 15, or the time required for the process for generating the image data varies.

Because the vertical synchronization time prescribed by the vertical synchronization signal DVsync is constant in the present embodiment, as described earlier, even if the horizontal synchronization time TDH in the subject display area R1 is increased, display of all lines of the liquid crystal panel 42 must finish within a constant vertical synchronization time. In order for this to be achieved, the horizontal synchronization time in the information display area R2 of the liquid crystal panel 42 for displaying text indicating information such as image-capturing conditions is brought lower than the reference time TH by the timing generator 30 so as to cancel out the cumulative difference between the increased horizontal synchronization time in the lines of the subject display area R1 and the reference time TH.

Specifically, because OSD data indicating information such as image-capturing conditions can be prepared in advance and stored in the VRAM 51 regardless of operation of the area image sensor 15, the time required for the process for generating the image data for the lines of the information display area R2 is essentially just the time required to read the data for one line from the VRAM 51. Therefore, even when displayed using the short horizontal synchronization time for displaying based on OSD data, the data can be displayed correctly without overtaking reading of the data.

Specifically, the timing generator 30 adjusts the output timing of the horizontal synchronization signal DHsync to shorten the horizontal synchronization time TDH2 such that the sum of the difference between the increased horizontal synchronization time TDH in the subject display area R1 and the reference time TH matches the sum of the difference between the shortened horizontal synchronization time TDH2 in the information display area R2 and the reference time TH. As a result, the following relation obtains: horizontal synchronization time TDH2<the reference time≤the horizontal synchronization time TDH. Various configurations may be employed as a configuration for outputting the horizontal synchronization signal DHsync such that the horizontal synchronization time TDH2 is shorter than the horizontal synchronization time TH in the information display area R2. For example, as shown in FIG. 6, a configuration may be employed in which the time to be shortened at each line is a value ΔT2 obtained by dividing the sum (ΣΔT1) of the delay ΔT1 for the horizontal synchronization time TH generated in the subject display area R1 by the number of lines L2 of the information display area R2. That is, a configuration may be employed in which the horizontal synchronization time TH−ΔT2 is the horizontal synchronization time TDH2 in the information display area R2.

According to this configuration, OSD data indicating information such as image-capturing conditions are displayed in the information display area R2 within a short horizontal synchronization time while displaying the subject captured by the area image sensor 15 in the subject display area R1 at a minimal delay. Because the horizontal synchronization time is also controlled such that the sum of the difference between the increased horizontal synchronization time TDH in the subject display area R1 and the reference time TH matches the sum of the difference between the shortened horizontal synchronization time TDH2 in the information display area R2 and the reference time TH as described earlier, the data can be displayed by the display unit 40 in a state in which the cycles of the vertical synchronization signals SVsync and DVsync are the same and constant. Therefore, there is no need to delay the subject captured by the area image sensor 15 for a time of at least of one frame before displaying on the liquid crystal panel 42, or to display the same image on the liquid crystal panel 42 over a plurality of frames.

(3) Other Embodiments

The embodiment described earlier is one example of an embodiment of the present invention, which is not limited to specifying whether or not the generation processing of image data has ended based on progress information and displaying the lines for which this generation processing has ended. Taking a unit such as i lines and/or j pixels (i and j being natural numbers) as a predetermined data unit, whether or not the generation processing of image data has ended based on progress information may be specified by predetermined data unit, and the predetermined data unit for which this generation processing has ended may be displayed. Other embodiments, such as a combination of the following embodiments, may also be employed.

Although the image data output section 201 synthesizes a subject image with an image indicating OSD data in the embodiment described earlier, an example in which the time required to prepare image data for each line can vary is an example of synthesizing a background image data as a first image with an object image depicting a 3D object as a second image. For example, in a computer game, image data to be displayed on a display unit are generated by drawing, in advance, a background image with little movement and a low update frequency, and an object image with a lot of movement and a high update frequency separately, then overlapping the object image on the background image. In this case, because the image data for the lines representing the background image alone have a low update frequency, these data may be acquired merely by reading earlier data stored in a memory. The image data for the lines including pixels indicating the object image, on the other hand, must depict the object image at a short cycle, and require a longer time for the generation processing than the lines indicating just the background image. Applying the present invention to such a case can shorten delay and prevent applying the display processing to a line before the generation processing.

For example, the back porch of the horizontal synchronization signal DHsync may be increased when the horizontal synchronization time is longer than the reference time TH. In the configuration shown in FIG. 1, for example, this configuration is a configuration in which the time when progress information is outputted by the resizing section 20e is detected by the progress information acquisition section 30a. Specifically, the time TS (N−1) is detected from the progress information outputted at the timing when the process for generating the image data for the (N−1)$^{th}$ line of the processing sequence has ended to the progress information outputted at the timing when the process for generating the image data for the N$^{th}$ line has ended. The timing generator 30 then determines the length of the back porch of the horizontal synchronization signal DHsync for the N$^{th}$ line based on this time TS(N−1) before outputting the various signals.

Figure 7:
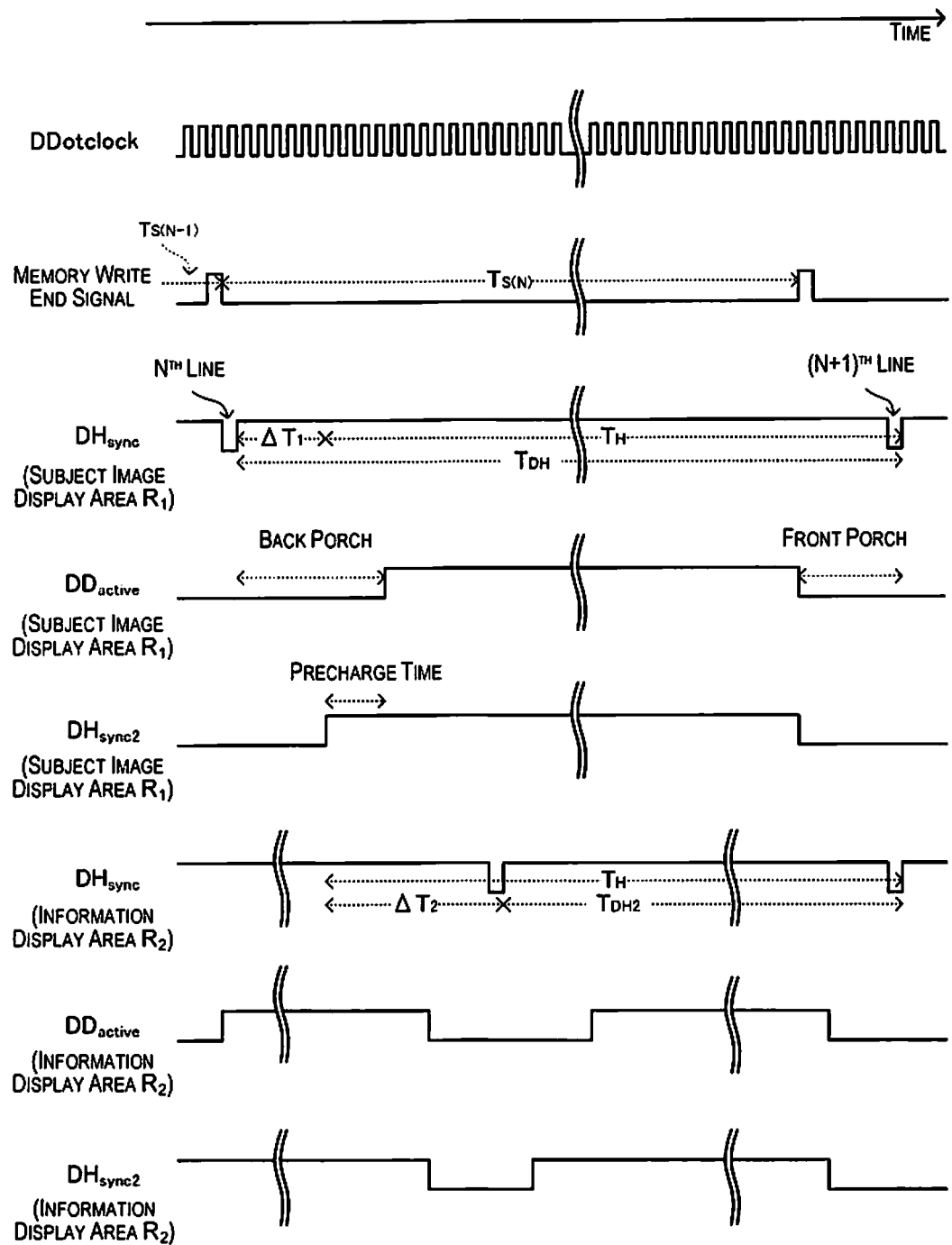
FIG. 7 is a timing chart according to another embodiment of the present invention.

Specifically, the timing generator 30 outputs a signal DHsync2 indicating a precharge time when a time ΔT1 obtained by subtracting the length of the reference time TH from the length of the time TS(N−1) has elapsed after the processing of the display control section 30b outputs the horizontal synchronization signal DHsync for the N$^{th}$ line as shown in FIG. 7. The timing generator 30 outputs DDactive when a predetermined precharge time has elapsed after the processing of the display control section 300b outputs this signal DHsync2, and outputs the horizontal synchronization signal DHsync for the (N+1)$^{th}$ line with a front porch of a predetermined time inserted after maintaining the level of DDactive until the DDotclock of the number of pixels of one line has been outputted. The time from the start time of this precharge time until the end of the front porch matches the reference time TH. Therefore, the horizontal synchronization time TDH, which is the time between the horizontal synchronization signal DHsync for the N$^{th}$ line and the horizontal synchronization signal DHsync for the (N+1)$^{th}$ line, is the sum of the reference time TH and ΔT1. As a result, the N$^{th}$ line can be displayed on the liquid crystal panel 42 by means such as precharging or inverting the polarity synchronized with the signal DHsync2, and the horizontal synchronization time TDH can be made longer than the reference time TH.

Because the front porch of the horizontal synchronization signal DHsync is increased in the embodiment just described, the back porch time can be a constant time, and a time for precharging, inverting the polarity, or the like can be inserted following a conventional rule.

Also in the embodiment described earlier, the horizontal synchronization signal SHsync was outputted such that the horizontal synchronization time was shorter in the information display area R2 of the liquid crystal panel 42 than in the subject image display area R1 in order to match the cycle of the vertical synchronization signal SVsync of the area image sensor 15 with the cycle of the vertical synchronization signal DVsync of the liquid crystal panel 42. The cycle of the vertical synchronization signal SVsync, however, may be matched with the cycle of the vertical synchronization signal DVsync of the liquid crystal panel 42 by other means. For example, in a conventional image-capturing device, the number of lines of the area image sensor 15 is greater than the number of lines of the liquid crystal panel 42. Therefore, assuming that the horizontal synchronization time to be provided is uniform within a specific vertical synchronization time, the horizontal synchronization signal DHsync of the liquid crystal panel 42 is shorter than the horizontal synchronization signal SHsync of the area image sensor 15. Therefore, even if the horizontal synchronization signal DHsync of the liquid crystal panel 42 is increased, this increasing will rarely necessitate increasing the vertical synchronization time of the liquid crystal panel 42. When the vertical synchronization signal DVsync of the liquid crystal panel 42 is made longer than the vertical synchronization signal SVsync of the area image sensor 15 by increasing the horizontal synchronization signal DHsync, the vertical synchronization signal SVsync of the area image sensor 15 may be increased to synchronize the vertical synchronization signal DVsync with the vertical synchronization signal SVsync.

Figure 8:
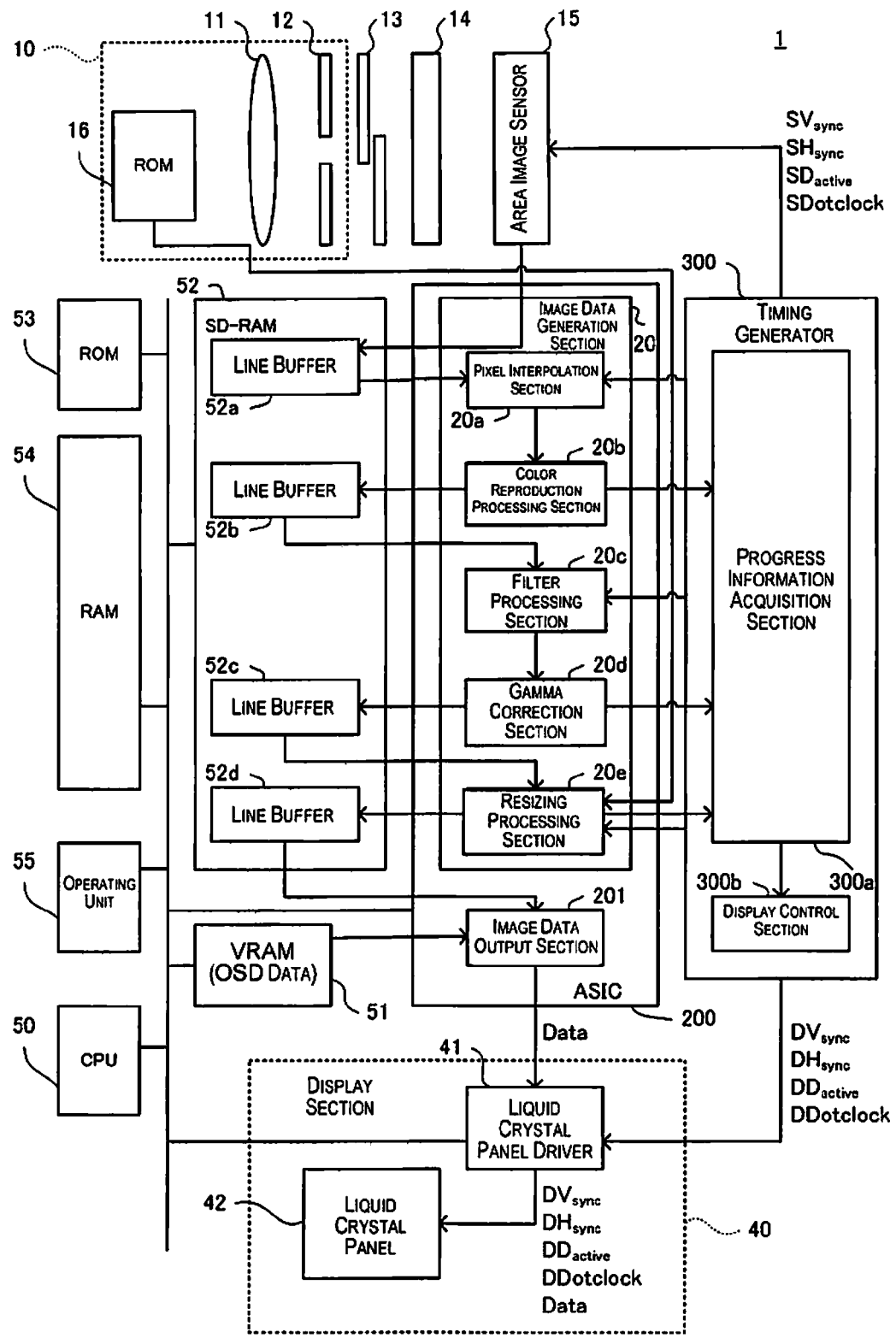
FIG. 8 is a block diagram according to another embodiment of the present invention.

FIG. 8 is a drawing showing an image-capturing device 1 having a configuration for acquiring progress information regarding a plurality of image processing steps for generating the data for one line by referring to the data for a plurality of lines. Configurations similar to FIG. 1 are shown in FIG. 8 using the same symbols. The timing generator 300 of the image-capturing device 1 shown in FIG. 8 can acquire progress information indicating lines for which output of output data from area image sensor 15 has ended, and lines for which the generation processing of data in the color reproducing section 20b, the gamma correcting section 20d, and the resizing section 20e of the ASIC 200 has ended. The timing generator 300 can also output a trigger signal (for example, the horizontal synchronization signal) for starting the generation processing of the data for one line in the pixel interpolating section 20a, the filter processing section 20c, and the resizing section 20e by the processing of the display control section 300b.

Specifically, in the embodiment shown in FIG. 8, it is specified in advance that data for the $L^{th}$ line can be processed in the pixel interpolating section 20a when output data for the $K^{th}$ line have been outputted by the area image sensor 15, and data for the Mth line can be processed in the filter processing section 20c when processing of data for the $L^{th}$ line has ended as a result of processing performed line by line by the pixel interpolating section 20a and the color reproducing section 20b. It is also specified that the process for generating the image data for the $N^{th}$ line can be started in the resizing section 20e when processing of data for the Mth line has ended as a result of processing line by line by the filter processing section 20c and the gamma correcting section 20d.

The timing generator 300 specifies that output data for the $K^{th}$ line have been outputted by the area image sensor 15 based on a horizontal synchronization signal SHsync of a cycle prescribed by the output of the timing generator 300. Upon specifying that output data for the $K^{th}$ line by the area image sensor 15 have been outputted, the timing generator 300 outputs a trigger signal to the pixel interpolating section 20a to start processing the data for the $L^{th}$ line. When the progress information acquisition section 300a has specified that processing of the data for the $L^{th}$ line in the color reproducing section 20b has ended, the timing generator 300 outputs a trigger signal to the filter processing section 20c to start processing the data for the Mth line. When the progress information acquisition section 300a has specified that processing of the data for the Mth line in the gamma correcting section 20d has ended, the timing generator 300 outputs a trigger signal to the resizing section 20e to start the process for generating the image data for the $N^{th}$ line.

Upon specifying that the process for generating the image data for the $N^{th}$ line by the resizing section 20e has ended, the timing generator 300 outputs the horizontal synchronization signal DHsync for displaying the $N^{th}$ line in the same manner as in the embodiments described earlier. Specifically, the ASIC 200 determines whether or not the generation processing of data of the minimum required number of lines has ended during an image processing step capable of starting generation of the data of a given line after the data of at least two lines have been stored in a line buffer, and starts the next image processing step at the timing when this generation processing ended. This configuration can start processing for each line as soon as the data of each line are ready without starting processing for each line before the generation processing of the data required to carry out each step has ended. This has the effect of shortening the wait time when carrying out each image processing step. Because data of the minimum required number of lines may be stored temporarily in the line buffers 52a to 52d in the present embodiment, the line buffers 52a to 52d can have a minimal capacity.

Although the display unit 40 in the embodiment described earlier was an EVF using a liquid crystal panel, the display unit 40 may be a display unit other than an EVF; for example, a display unit using a liquid crystal panel attached to the back of the image-capturing device 1, and may use a system other than a liquid crystal panel. The image-capturing device 1 may be a single-lens reflex camera having a mirror, a video camera, or an apparatus such as a mobile telephone with a camera function. Although the filters in the area image sensor 15 were a Bayer matrix, the present invention may also be applied to an image-capturing device using sensors comprising an array other than a Bayer matrix. The line buffer 52d may be a line buffer, or a VRAM having sufficient memory capacity to store the image data for one frame. According to this configuration, various types of processing can be applied based on the image data that will be displayed. The horizontal synchronization time may be increased relative to a reference time, and various times can be imagined as this reference time. For example, the reference time may be the cycle of the horizontal synchronization signal SHsync of the area image sensor 15, or the cycle for generating image data. Various modes can be employed as the transmission mode of the various signals from the timing generator 30 to the display unit 40, which may be transmitted via HDMI (high-definition multimedia interface) or the like. The directions in the embodiments described earlier may also be reversed and shown, for example, from left to right or from right to left horizontally.

OSD data need merely be image data indicating predetermined information to be displayed in the information display area of the display unit, and may comprise various types of information other than image-capturing conditions; for example, the predetermined information to be displayed may be information indicating the remaining life of a battery housed in the image-capturing device 1. Various configurations other than the configurations described earlier can be employed for the configuration for making the cycles of the vertical synchronization signals SVsync and DVsync the same and constant. For example, the present invention may be configured such that display of all lines of the liquid crystal panel 42 has ended at or before the output timing of the vertical synchronization signal DVsync, and the vertical synchronization signal DVsync has been outputted at a prescribed output timing after waiting for the remaining time by making the horizontal synchronization time in the information display area R2 the minimum settable time for displaying OSD data in the information display area R2 after displaying a subject image in the subject display area R1. In this case, the time from the end of the generation processing for the $N^{th}$ line to the start of the display processing for the $(N+1)^{th}$ line is shortened in the 683rd to the 768th lines corresponding to the information display area R2 in the embodiments described earlier. The OSD data correspond to the first image, and the subject image corresponds to the second image. The present invention may also be applied to an image-capturing device that does not display OSD data.

In the illustrated embodiment, an image data generating section performs generation processing for generating image data in a predetermined processing sequence for individual predetermined data units. A control section causes a display processing to be performed for a plurality of predetermined data units using a shared processing sequence when the process of generating the image data ends. The control section is configured to control the display unit so that the longer a first time relating to the generation processing for one of the predetermined data units of the image data is, the longer a second time until the display processing starts for the one of the predetermined data units of the image data is. The first time may be a time from an end of the generation processing for an $N^{th}$ predetermined data unit (N is a natural number) in the processing sequence to an end of the generation processing for the $(N+1)^{th}$ predetermined data unit in the processing sequence, and the second time may be a time from an end of the generation processing for the $N^{th}$ predetermined data unit to the start of the display processing for said $(N+1)^{th}$ predetermined data unit. This configuration can increase the delay from the end of the generation processing to the start of the display processing of image data by just the amount required for a predetermined data unit requiring a long time to prepare image data when the time required to prepare image data varies by predetermined data units.

When the first time is a time from the end of the generation processing for the $N^{th}$ predetermined data unit in the processing sequence to the end of the generation processing for the $(N+1)^{th}$ predetermined data unit in the processing sequence, and the second time is a time from the start of the display processing for the $N^{th}$ predetermined data unit to the start of the display processing for the $(N+1)^{th}$ predetermined data unit, this configuration delays the start of the display processing for the $(N+1)^{th}$ predetermined data unit to the extent that the end of the generation processing for the $(N+1)^{th}$ predetermined data unit is delayed.

This predetermined data unit may be one line or a plurality of lines. Taking the end of the generation processing for each of the predetermined data units as a trigger to start the display processing can prevent starting the display processing for a predetermined data unit before the generation processing has ended. "Taking the end of the generation processing . . . as a trigger to start the display process" means that the end of the generation processing is an essential condition for starting the display processing, and the display processing is started simultaneously with or a predetermined time after the end of the generation processing.

The effect is greater when more time is required to prepare image data varies by predetermined data units. This is because a delay can be prevented based on the difference in the predetermined data units of the time required to prepare image data. An example of a process for varying the time required to prepare image data according to predetermined data units is a process performed using data generated in a previous step for the predetermined data units of the previous step, and using the data for a number of predetermined data units of the previous step according to the location of the predetermined data units to be processes. Due to the varying in the wait time until data to be used according to the number of predetermined data units in the previous step have been prepared, the time required to prepare image data differs according to the location; i.e., N, of the predetermined data units to be processed. A more specific example of a process for varying the time required to prepare image data by predetermined data units is distortion correction to eliminate distortion. This distortion correction generates image data for individual predetermined data units based on output data acquired from an image-capturing sensor (for example, an area image sensor), and varies the volume of output data required according to the location of each predetermined data unit. Specifically, the time required to prepare image data is varied by predetermined data units to vary the wait time until the required output data have been supplied according to the locations of the predetermined data units. This is because distortion is strongly dependent on the location in an image, and a larger range of images in the image-capturing sensor is required for a predetermined data unit located where there is greater distortion. The first time may include a variable time required for the generation processing and a predetermined invariable time, and may have a predetermined tendency according to the value of N. The second time may also have a predetermined tendency according to the value of N.

An image data generating section may carry out a generation processing for varying the time required according to how frequently an image representing a predetermined data unit is updated. Between a first image and a second image with a higher update frequency than the first image, preparing image data for a predetermined data unit indicating the second image takes more time. This is because of the high probability that new image data must be generated for a second image with a higher update frequency. For a first image with a low update frequency, on the other hand, the time to prepare image data is shorter because of the high probability that image data already generated need just be read from a memory. Therefore, the time required to prepare image data when synthesizing a first image with a second image varies between a predetermined data unit containing just the first image and a predetermined data unit containing the second image. If the first image and the second image are overlapped at set levels of transparency, the time required to prepare image data is longer for a predetermined data unit that contains overlapping pixels in which the second image is non-transparent (has less than 100% transparency).

This first image need merely have a relatively lower update frequency. For example, when an on-screen display (OSD) image, which indicates inter alia conditions under which images are captured by a camera, and which is updated only during operation, is synthesized with a subject image based on the output signal of an image-capturing sensor, the OSD image is the first image. The distortion correction described earlier may also be applied to a second image that is a subject image.

When computer graphics are displayed, a background image with relatively little movement and an object with a lot of movement are depicted separately before an image depicting the object against the background image is synthesized. In this case, the image depicting an object with a lot of movement is the second image with a higher update frequency, and the time required to prepare image data for a predetermined data unit containing the second image is especially increased when the object depicted is a three-dimensional object. In this case as well, the display control device as described above can start the display processing earlier for a predetermined data unit containing only a first image with a short time required to prepare image data. In particular, the present invention can be applied to achieve a display with high response when a computer game is displayed.

The image data generating section may also execute the generation processing for varying the time required to prepare image data according to gradations indicated by pixels belonging to a predetermined data unit. For example, when gamut mapping, gamut clipping, or the like is applied only to a predetermined range of gradations from the border of a gamut, a predetermined data unit that contains pixels indicating gradations in this range will require a longer time to prepare image data than a predetermined data unit that does not contain pixels indicating gradations in this range. Similarly, when, for example, memory color compensation is applied only to gradations belonging to a color band of memory color, a predetermined data unit that contains pixels indicating gradations of this color band will require a longer time to prepare image data than a predetermined data unit that does not contain pixels indicating gradations of this color band.

Moreover, according to the forgoing aspects of the present invention, a technique that starts the display processing earlier the earlier the generation processing for a predetermined data unit ends can be applied as a circuit, a program, or a method. An apparatus, circuit, program, or method such as this may encompass different modes, which may be realized as a single apparatus or by using shared elements in apparatuses having a plurality of functions.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. An imaging device comprising:
a lens unit;
an image sensor configured to output a first data based on a subject image through the lens unit;
a processing unit configured to correct a distortion of the first data caused by an optical property of the lens unit and to output a second data obtained by correcting the first data; and
a display unit configured to display based on the second data for each of predetermined lines in a display area, the predetermined lines including a first predetermined line and a second predetermined line, the first predetermined line being a line displayed in the display area at a first or last horizontal synchronization time, the second predetermined line being a line displayed in the display area at horizontal synchronization time other than the first or last horizontal synchronization time, and the first or last horizontal synchronization time being longer than the horizontal synchronization time other than the first or last horizontal synchronization time.

2. The imaging device according to claim 1, wherein
the optical property of the lens unit is a barrel aberration, and
the processing unit is configured to correct the first data to eliminate the barrel aberration from the first data.

3. The imaging device according to claim 1, wherein
the optical property of the lens unit is a pincushion aberration, and
the processing unit is configured to correct the first data to eliminate the pincushion aberration from the first data.

4. The imaging device according to claim 1, wherein
the lens unit includes a memory that stores information of the optical property, and
the processing unit is configured to correct the distortion of the first data based on the information of the optical property.

5. The imaging device according to claim 1, wherein
the first horizontal synchronization time is a time from an end of the last horizontal synchronization time at an immediately preceding frame to an end of the first horizontal synchronization time.

6. The imaging device according to claim 1, wherein
the last horizontal synchronization time is a time from an end of an immediately preceding horizontal synchronization time to an end of the last horizontal synchronization time.

7. The imaging device according to claim 1, wherein
the horizontal synchronization time other than the first or last horizontal synchronization time is a time from an end of an immediately preceding horizontal synchronization time to an end of the horizontal synchronization time.

8. An imaging device comprising:
a lens unit;
an image sensor configured to output a first data based on a subject image through the lens unit;
a processing unit configured to correct a distortion of the first data caused by an optical property of the lens unit and to output a second data obtained by correcting the first data; and
a display unit configured to display based on the second data for each of predetermined lines in a display area, the predetermined lines including a first predetermined line and a second predetermined line, the first predetermined line being displayed in the display area at a first or last horizontal synchronization time, the second predetermined line being displayed in the display area at horizontal synchronization time other than the first or last horizontal synchronization time, and the horizontal synchronization time other than the first or last horizontal synchronization time being shorter than the first or last horizontal synchronization time.

* * * * *